United States Patent
Matsumoto et al.

(10) Patent No.: US 6,522,106 B2
(45) Date of Patent: Feb. 18, 2003

(54) AUTOMATIC VOLTAGE REGULATING SYSTEM FOR ENGINE GENERATOR

(75) Inventors: Takehiro Matsumoto, Nitta-gun (JP); Takao Tamechika, Wako (JP)

(73) Assignees: Sawafuji Electric Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/365,507

(22) Filed: Aug. 2, 1999

(65) Prior Publication Data

US 2002/0070714 A1 Jun. 13, 2002

(30) Foreign Application Priority Data

Aug. 3, 1998 (JP) ............................................. 10-219118

(51) Int. Cl.⁷ .......................... H02H 7/06; H02P 11/00; H02P 9/00; H02P 9/10; H02P 9/14
(52) U.S. Cl. ........................... 322/28; 322/24; 322/25; 322/63
(58) Field of Search ......................... 68/12.04; 363/20, 363/132, 19, 101, 21; 361/95; 323/19; 322/28, 24

(56) References Cited

U.S. PATENT DOCUMENTS

| | | | | |
|---|---|---|---|---|
| 3,935,530 A | * | 1/1976 | Tanaka et al. ................. | 323/19 |
| 4,129,819 A | * | 12/1978 | Arendt ......................... | 322/28 |
| 4,131,938 A | * | 12/1978 | Milberger et al. ........... | 363/101 |
| 4,486,801 A | * | 12/1984 | Jackovich et al. ............ | 361/21 |
| 4,599,552 A | * | 7/1986 | Phillips et al. ................ | 322/28 |
| 4,680,530 A | * | 7/1987 | Mashino ...................... | 322/33 |
| 4,755,737 A | * | 7/1988 | Komurasaki et al. ......... | 322/99 |
| 4,807,106 A | * | 2/1989 | Baker et al. .................. | 363/84 |
| 4,956,741 A | * | 9/1990 | Murphy et al. ............... | 361/95 |
| 4,973,896 A | * | 11/1990 | Shiga et al. .................. | 322/28 |
| 5,126,650 A | * | 6/1992 | Iwatani ........................ | 322/90 |
| 5,214,371 A | * | 5/1993 | Naidu .......................... | 322/29 |
| 5,485,365 A | * | 1/1996 | Dan-Harry ................... | 363/132 |
| 5,497,071 A | * | 3/1996 | Iwatani et al. ................ | 322/28 |
| 5,554,923 A | * | 9/1996 | Maddali et al. ............... | 322/25 |
| 5,581,451 A | * | 12/1996 | Ochiai ......................... | 363/21 |
| 5,675,237 A | * | 10/1997 | Iwatani ........................ | 322/28 |
| 5,686,819 A | * | 11/1997 | Iwatani et al. ................ | 322/25 |
| 5,822,200 A | * | 10/1998 | Stasz ........................... | 363/21 |
| 5,969,954 A | * | 10/1999 | Zaitsu ......................... | 363/16 |
| 5,973,482 A | * | 10/1999 | Meinert ....................... | 322/86 |
| 5,979,194 A | * | 11/1999 | Matsumoto et al. ......... | 68/12.04 |
| 5,982,642 A | * | 11/1999 | Herfurth ...................... | 363/21 |
| 6,038,144 A | * | 3/2000 | Matsumoto et al. .......... | 363/19 |
| 6,049,471 A | * | 4/2000 | Korcharz et al. ............. | 363/20 |

FOREIGN PATENT DOCUMENTS

JP  4-101300  9/1992

* cited by examiner

*Primary Examiner*—Nestor Ramirez
*Assistant Examiner*—Julio Gonzalez Ramirez
(74) *Attorney, Agent, or Firm*—Arent Fox Kintner Plotkin & Kahn

(57) ABSTRACT

An automatic voltage-regulating system for an engine generator includes an output voltage detecting device for extracting a single-phase AC output voltage from an output winding wound around a stator to output a detection voltage, and a switching device for regularizing the output voltage to be substantially at a constant level by selectively conducting and cutting off of a field current supplied from an exciting winding wound around the stator to a field winding wound around a rotor. Depending upon whether the detection voltage is higher or lower than a predetermined value, the charged voltage of a condenser for smoothing a rectified output from the field winding is divided by a pair of voltage dividing resistors. A switch device is forcibly turned on by a detection voltage in response to the voltage at a connection point between the pair of resistors exceeding a predetermined voltage value, to thereby cause the smoothing condenser to be discharged.

2 Claims, 3 Drawing Sheets

AUTOMATIC VOLTAGE REGULATING SYSTEM FOR ENGINE GENERATOR

BACKGROUND OF THE INVENTION

1. Field of the Invention

The present invention relates to an automatic voltage-regulating system for an engine generator, comprising an output voltahe detecting means for extracting a single-phase AC output voltage generated in an output winding wound around a stator to output a detection voltage from a detection output terminal, and a switching means for regularizing the single-phase AC output voltage to be substantially at a constant level by selectively permotting conducting and cutting off of a field current supplied from an exciting winding wound around the stator to a field winding wound around a rotor depending upon whether the detection voltage provided by the output voltage detecting means is higher or lower than a predetermined value.

2. Description of the Related Art

A prior art automatic voltage-regulating system for an engine generator is designed such that the field current flowing in a field winding 3 is controlled based on a voltage generated in an exciting winding 4 by turning on and off a switching means 10 including a plurality of transistors 22, 23 and 24 connected through the Darlington circuit by a DC detecting voltage provided by extracting a portion of the voltage generated in output windings 1 and 2, as shown in FIG. 3, thereby regularizing the voltage generated in the output windings 1 and 2. However, if a load 6 connected to either one of the output windings 1 and 2, e.g., to the output winding 1 is a condensive load such as a mercury-arc lamp, a metal halide lamp and the like, there is a possibility that the fracture of the smoothing condenser 8 may occur based on an induced voltage generated in the field winding 3.

More specifically, if the load 6 is a condensive load, an alternating voltage of even-number order higher harmonics, which is not generated when the load 6 is a resistance load, is induced in the field winding 3 wound oround a rotor by flowing of a condensive current in the output winding 1. If one cycle of an alternating voltage of a low-order higher harmonic is considered, electric current, in a minus-side half-wave, flows from a negative electrode 3m of the field winding 3 via a diode 12 to a positive electrode 3p of the field winding 3, as shown by broken lines, and on the other hand, in a plus-side half-wave, electric current flows from the positive electrode 3p of the field winding 3 via the smoothing condenser 8 and a diode 13 to the negative electrode 3m of the field winding 3, as shown by solid lines. Therefore, the smoothing condenser 8 is charged with an induced voltage produced in the field winding 3, and this is repeated through the passage of time, so that a voltage is gradually accumulated in the smoothing condenser 8 and this may finally result in fracturing of the smoothing condenser 8.

To solve the above problem, an automatic voltage-regulating system disclosed in Japanese Utility Model Laid-open No.4-101300 is designed such that the fracture of the smoothing condenser 8 is prevented by the following two circuits: a short circuit which is connected in parallel to the field winding 3 to short-circuit an induced voltage produced in the field winding 3, when the induced voltage exceeds a predetermined value, and an inhibiting circuit comprising a diode connected in series to the field winding 3 in a direction of the flowing of the field current.

In the automatic voltage-regulating system disclosed in the above Japanese Utility Model Laid-open No. 4-101300, however, the short circuit including a thyristor and the inhibiting circuit including the diode are required. Thus, it is impossible to mention that number of parts is small as a circuit arrangement for preventing the fracture of the smoothing condenser in the case the condensive load is connected to the output winding, or to mention that the circuit arrangement is simple.

SUMMARY OF THE INVENTION

Accordingly, it is an object of the present invention to provide an automatic voltage-regulating system of the above-described type for an engine generator, wherein the fracture of the smoothing condenser can be prevented despite provision of the condensive load, by additionally providing a simple circuit constructed of a reduced number of parts, thereby providing a stable output voltage.

To achieve the above object, according to the present invention, there is provided an automatic voltage-regulating system for an engine generator, comprising an output voltage detecting means for extracting a single-phase AC output voltage generated in an output winding wound around a stator to output a detection voltage from a detection output terminal, and a switching means for regularizing said single-phase AC output voltage to be substantially at a constant level by selectively permitting conducting and cutting off of a field current supplied from an exciting winding wound around said stator to a field winding wound around a rotor depending upon whether the detection voltage provided by said output voltage detecting means is higher or lower than a predetermined value, wherein the system further comprises a rectifying circuit for rectifying a field current supplied from said exciting winding to said field winding, a smoothing condenser for smoothing a rectified output from said rectifying circuit, a pair of voltage dividing resistors for dividing a charged voltage in said smoothing condenser, and a switch means for forcibly lowering a detection voltage appearing at said detection output terminal of said output voltage detecting means in response to a voltage at a connection point between said pair of voltage dividing resistors exceeding said predetermined value, and wherein when said smoothing condenser is in a state charged with an excessive voltage, said switch means is forcibly turned on in response to said detection voltage being forcibly lowered by said switch means to thereby cause a charged current in said smoothing condenser to be discharged.

With such arrangement, if an induced voltage is produced in the field winding in response to flowing of condensive current in the output winding due to the connection of a condensive load, the smoothing condenser is charged. If the charged voltage in the smoothing condenser becomes high and the voltage at the connection point between both the voltage dividing resistors exceeds the predetermined voltage, a detection voltage appearing at the detection output terminal of the output voltage detecting means is forcibly lowered by the switch means, whereby the switching means is turned on and the charged voltage in the smoothing condenser is discharged to the field winding. Thus, it is possible to prevent the smoothing condenser and the like from being fractured due to the excessive voltage. Moreover, to prevent the fracture of the smoothing condenser, it is only required to add, to the automatic voltage regulating system, a circuit which is simple and constructed of reduced number of parts including a pair of voltage dividing resistors and a switch means.

According to the invention, in addition to the above-mentioned first feature, such a second feature is proposed that said switch means is a transistor which forcibly short-circuits the detection voltage appearing at said detection output terminal by conducting. Owing to this feature, the circuit arrangement for preventing the fracture of the smoothing condenser is further simplified.

The above and other objects, features and advantages of the invention will become apparent from the following description of the preferred embodiments taken in conjunction with the accompanying drawings.

DESCRIPTION OF THE PREFERRED EMBODIMENTS

Figure 1:
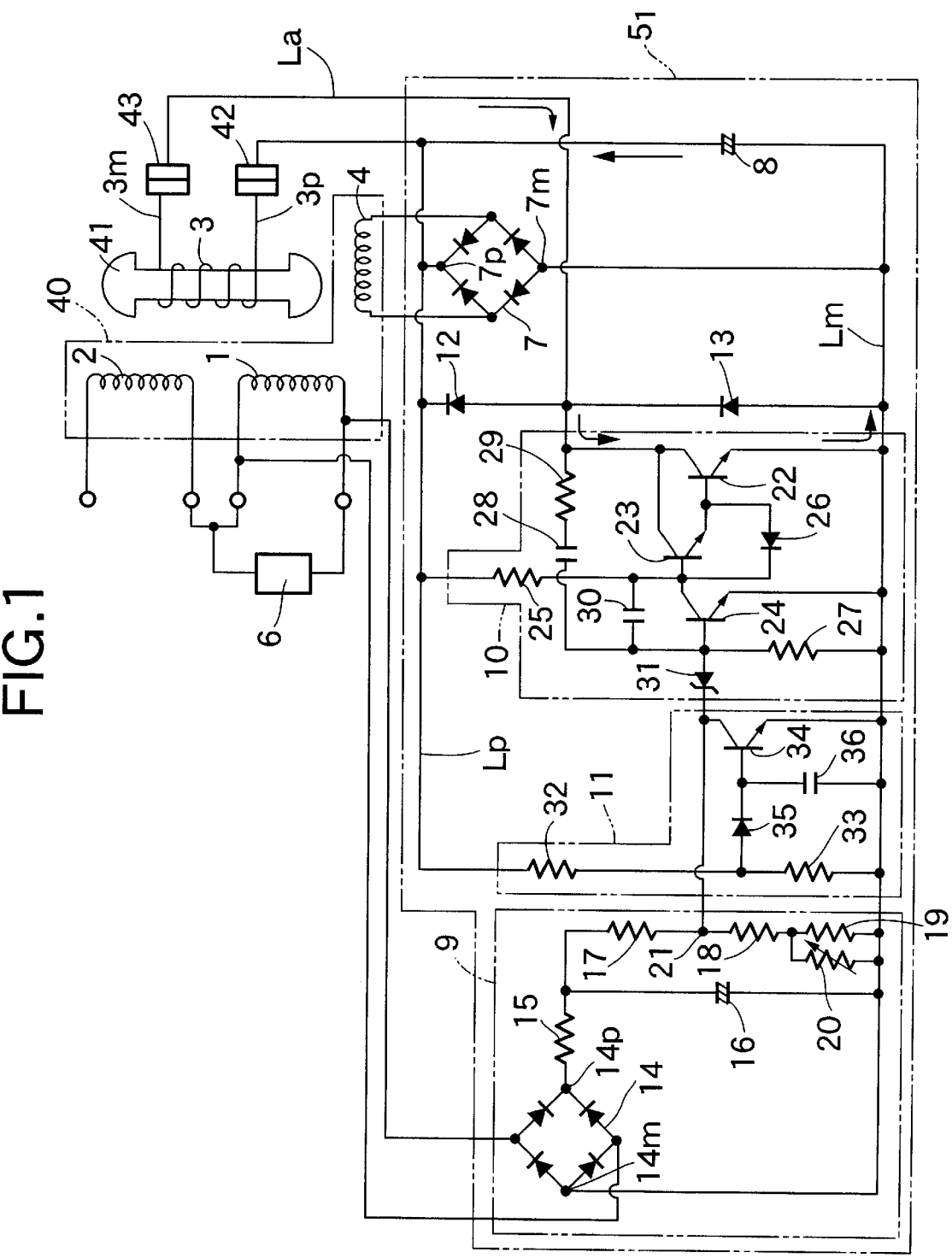
FIG. 1 shows a circuit arrangement of an automatic voltage regulating system according to a first embodiment of the present invention.

A first embodiment of the present invention will now be described with reference to FIG. 1. An engine generator includes a pair of output windings 1 and 2 connected serially or parallel with each other and wound around a stator 40, a field winding 3 wound around a rotor 41 driven by a motor which is not shown, an exciting winding 4 wound around the stator 40 for generating a voltage for permitting a field current to flow in the field winding 3, and an automatic voltage-regulating device $5_1$. A condensive load 6 such as a mercury lamp is connected to at least one of the output windings 1 and 2 that output a single-phase AC voltage, e;g., the output winding 1.

The automatic voltage-regulating device $5_1$ includes a rectifying circuit 7 connected to the exciting winding 4, a smoothing condenser 8 for smoothing the DC output provided in the rectifying circuit 7, an output voltage detecting means 9 for extracting a portion of the voltage generated in the output windings 1 and 2 to provide a DC detection voltage, a switching means 10 adapted to be turned on or off depending on the voltage provided by the output voltage detecting means 9 to control the field current to the field winding 3, and a condensive load countermeasure means 11 applied according to the present invention to prevent the rupture of the smoothing condenser 8 and the like based on an induction voltage induced in the field winding 3 due to the condensive load 6.

The rectifying circuit 7 has a plus-side DC output terminal 7p and a minus-side DC output terminal 7m and is connected to the exciting winding 4. The plus-side DC output terminal 7p is connected to a plus-side line Lp which leads to a positive electrode 3p of the field winding 3 through a slip ring 42, and the minus-side DC output terminal 7m is connected to a minus-side line Lm.

The smoothing condenser 8 is connected to the plus-side output terminal 7p of the rectifying circuit 7 which rectifies the AC voltage induced in the exciting winding 4 as well as to the plus-side line Lp leading to the positive electrode 3p at one end of the field winding 3 and smoothes the output of the rectifying circuit 7 into DC form. A diode 12 for a freewheel is mounted between the plus-side line Lp and a line La that is connected to the minus-side electrode 3m at the other end of the field winding 3 via a slip ring 43 for limiting the flow of electric current only from the negative electrode 3m to the positive electrode 3p of the field winding 3, and a diode 13 is mounted between the minus-side line Lm and the line La for limiting the flow of electric current only from the minus-side line Lm to the line La.

The output voltage detecting means 9 for extracting the voltage output from the output winding 1 to provide a DC detection voltage, and includes a rectifying circuit 14 connected to the output winding 1 and having a plus-side DC output terminal 14p and a minus-side DC output terminal 14m connected to the minus-side line Lm, a resistor 15 and a smoothing condenser 16 connected in series between the plus-side output terminal 14p and the minus-side line Lm, resistors 17, 18 and 19 connected in series between a connection point between the resistor 15 and the smoothing condenser 16 and the minus-side line Lm, and a variable resistor 20 connected in parallel to the resistor 19, so that the DC detection current provided by extracting the voltage generated in the output winding 1 is output from a detection output terminal 21 which is a connection point between the resistors 17 and 18. When the output voltage from the output winding 1 is high, the DC detection voltage may be provided through an intermediate tap so as to extract a portion of the output voltage.

The switching means 10 includes two npn transistors 22, 23 and a transistor 24 which are, for example, connected by the Darlington circuit to one another. The transistor 22 on the output side of the Darlington connection has a collector terminal connected to the line La and an emitter terminal connected to the minus-side line Lm; and the transistor 24 for controlling the transistor 23 which is on the input side of the Darlington connection has a collector terminal connected to the base of the transistor 23 and an emitter terminal connected to the minus-side line Lm. The base of the transistor 23 is connected to the plus-side line Lp through a resistor 25, and a diode 26 is provided between an emitter and a base of the transistor 23.

The base of the transistor 24 is connected to the minus-side line Lm through a resistor 27 and also connected the line La through a capacitor 28 and a resistor 29, and a capacitor 30 is provided between the bases of the transistors 23 and 24. Further, the base of the transistor 24 is connected to the detection output terminal 21 of the output voltage detecting means 9 through a Zener diode 31 that determines a predetermined value for the detection voltage of the output voltage detecting means 9.

The above switching means 10 ensures that when the output voltage from the detection output terminal 21 in the output voltage detecting means 9 is higher than the predetermined value, the conduction of the Zenor diode 31 turns the transistor 24 on to make the voltage at the base of transistor 22 substantially "0" whereby the transistor 22 is cut off to electrically disconnect the electric current path from the negative electrode 3m side of the field winding 3 to the minus-side line Lm side. On the other hand, when the output voltage from the detection output terminal 21 in the output voltage detecting means 9 is lower than the predetermined value, the transistor 22 is allowed to conduct in response to the cutting-off of the transistor 24 to electrically connect the electric current path from the negative electrode 3m side of the field winding 3 to the minus-side line Lm side. Thus, the field current to the field winding 3 which has been rectified and smoothed based on the voltage generated in the exciting winding 4 is controlled by the switching operation of the switching means 10, whereby the output voltage from the output windings 1 and 2 is regularized.

The condensive load countermeasure means 11 includes a pair of voltage dividing resistors 32 and 33 connected in series between the plus-side line Lp and the minus-side line Lm, i.e., between opposite ends of the smoothing condenser 8, an npn transistor 34 as a switch means provided between the detection output terminal 21 of the output voltage detecting means 9 and the minus-side line Lm, a diode 35 provided between a connection point between the voltage dividing resistors 32 and 33 and the base of the transistor 34, and a capacitor 36 provided between the base of the transistor 34 and the minus-side line Lm. The transistor 34 has a collector terminal connected to the detection output terminal 21 and an emitter terminal connected to the minus-side line Lm.

The condensive load countermeasure means 11 ensures that when the voltage provided by dividing the voltage between the plus-side and minus-side lines Lp and Lm by the voltage dividing resistors 32 and 33 exceeds a predetermined voltage, the transistor 34 is allowed to conduct, whereby the detection output terminal 21 of the output voltage detecting means 9 is forcibly electrically connected to the minus-side line Lm, i.e., the minus-side DC output terminals 7m and 14m of the rectifying circuits 7 and 14, resulting in the detection voltage appearing at the detection output terminal 21 being forcibly lowered and in response thereto the transistor 24 in the switching means 10 is cut off to provide conducting of the transistor 22.

In the condensive load countermeasure means 11, the diode 35 is used for determining a threshold voltage value in cooperation with the voltage between the emitter and base of the transistor 34. To obtain such a function, it is common to use a Zener diode. In the switching means 10, however, the plurality of transistors 22, 23 and 24 are connected by the Darlington circuit with one another and hence, the base current in the transistor 24, i.e., the current flowing from the output terminal of the output voltage detecting means 9 may be extremely small. Therefore, the capacitor of the transistor 34 provided between the output terminal 21 of the output voltage detecting means 9 and the minus-side line Lm may be also extremely small. Thus, to regularize the base voltage of the transistor 34, a forward band offset of the diode 35 can be used without use of a backward band offset of a Zener diode. The Zener diode is generally encapsulated in a glass pipe and hence, the greatest care must be taken in the handling during assembling, and an increase in cost is brought about. On the contrast, the use of the diode 35, as described above, facilitates the handling during assembling, but also contributes to a reduction in cost.

Further, the capacitor 36 acts to prevent the fracture of the transistor 22 due to the chattering of the transistor 34, and also acts to prevent the mis-operation of the transistor 34 due to a surge voltage.

Figure 3:
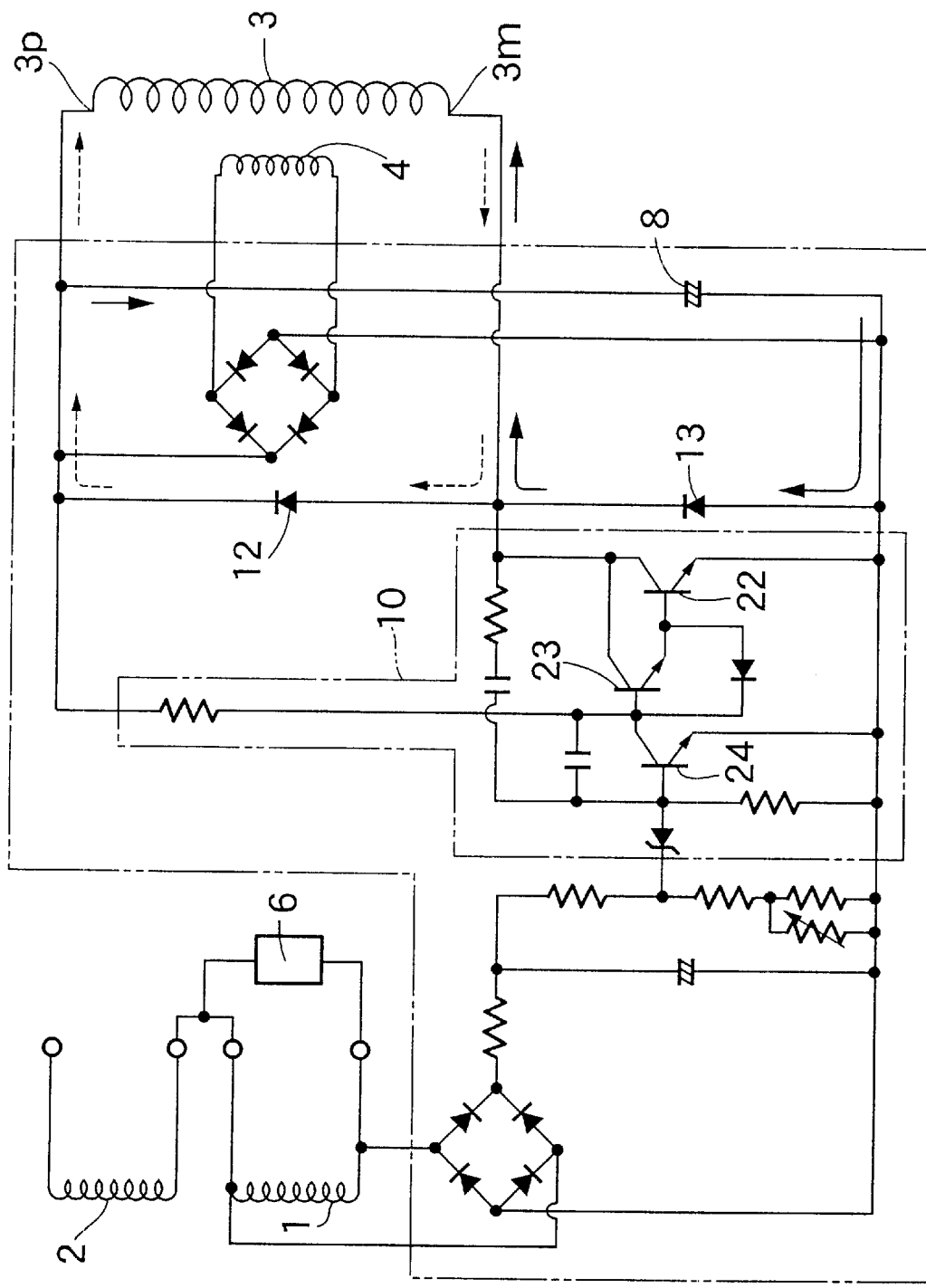
FIG. 3 shows a circuit arrangement of the prior art automatic voltage regulating system.

The operation of the first embodiment will be described below. If a condensive current flows across the output winding 1 due to the connection of the condensive load 6 thereto, an alternating voltage of an even-number order higher harmonic is induced in the field winding 3. In one cycle of the alternating voltage, in a minus-side half-wave in, electric current flows from the negative electrode 3m of the field winding 3 via the diode 12 to the positive electrode 3p of the field winding 3, as shown by broken lines in FIG. 3, and in a plus-side half-wave, electric current flows from positive electrode 3p of the field winding 3 via the smoothing condenser 8 and the diode 13 to the negative electrode 3m of the field winding 3, whereby the smoothing dondenser 8 is charged with the induced voltage generated in the field winding 3.

However, the condensive load countermeasure means 11 added to the automatic voltage-regulating device $5_1$ includes the pair of voltage dividing resistors 32 and 33 for dividing the charged voltage in the smoothing condenser 8, and the transistor 34 for forcibly and electrically connecting the detection output terminal 21 of the output voltage detecting means 9 to the minus-side DC output terminal 14m of the rectifying circuit 14, i.e., to the minus-side line Lm in response to the voltage at the connection point between the voltage dividing resistors 32 and 33 exceeding the predetermined voltage. Therefore, when the charged voltage in the smoothing condenser 8 is raised, so that the voltage at the connection point between the voltage dividing resistors 32 and 33 exceeds the predetermined voltage, the switching means 10 is forcibly turned on by the detection voltage at the detectoin output terminal 21 being forcibly lowered, in response to the conduction of the transistor 34, irrespective of the detection voltage detected by the output voltage detecting means 9. Therefore, when the voltage generated in the field winding 3 is lower than the charged voltage in the smoothing condenser 8, the charged voltage in the smoothing condenser 8 is discharged through the field winding 3 and through the transistor 22 and consumed inside the field winding 3. Thus, it is possible to prevent the smoothing condenser 8 from being fractured due to the charged voltage in the smoothing condenser 8 becoming excessive.

Moreover, to prevent the fracture of the smoothing condenser 8 and the like, it is only required to add the condensive load countermeasure means 11 including the pair of voltage dividing resistors 32 and 33 and the transistor 34 and having a simple circuit arrangement comprising a reduced number of components.

Figure 2:
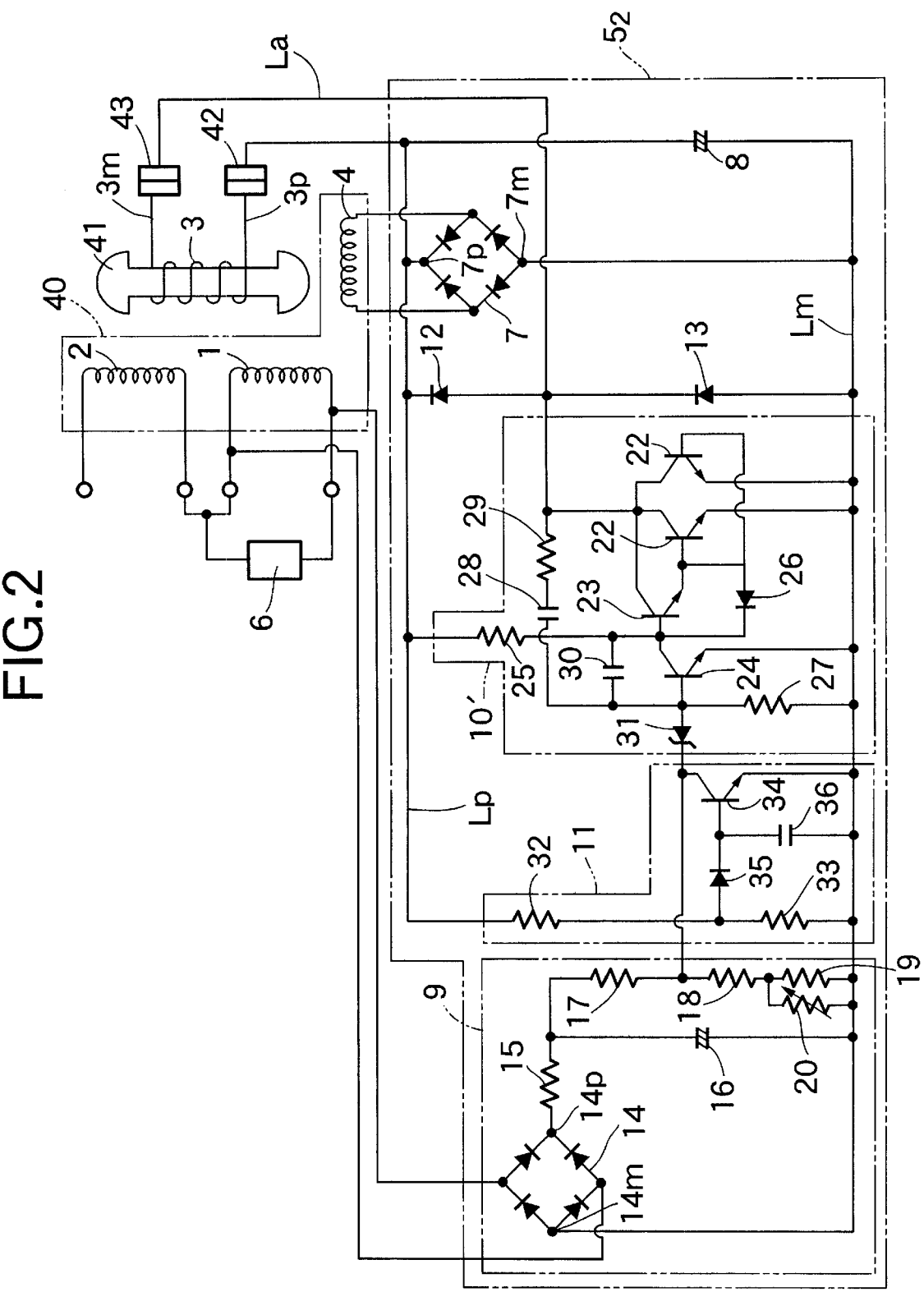
FIG. 2 shows a circuit arrangement of an automatic voltage regulating system according to a second embodiment of the present invention.

FIG. 2 shows a second embodiment of the present invention. An automatic voltage-regulating device $5_2$ according to the second embodiment is used when the output from an engine generator is larger. The automatic voltage-regulating device $5_2$ is different from the automatic voltage-regulating device $5_1$ only in respect of a switching means 10', and the other construction is the same as in the automatic voltage-regulating device $5_1$ according to the first embodiment.

The switching means 10' is different from the switching means 10 in the first embodiment in respect of a pair of transistors 22, 22 being provided in parallel between the negative electrode 3m of the field winding 3 and the minus-side line Lm.

Even with the second embodiment, even if the smoothing condenser 8 is charged due to the connection of the condensive load 6 thereto, the same effects as those achieved with the first embodiment can be provided.

Although the embodiments of the present invention have been described in detail, it will be understood that the present invention is not limited to the above-described embodiments, and various modifications may be made without departing from the spirit and scope of the invention defined in claims.

What is claimed is:

1. An automatic voltage-regulating system for an engine generator, comprising an output voltage detecting means for extracting a single-phase AC output voltage generated in an output winding wound around a stator to output a detection voltage from a detection output terminal, and a switching means for regularizing said single-phase AC output voltage to be substantially at a constant level by selectively permitting conducting and cutting off of a field current supplied from an exciting winding wound around said stator to a field winding wound around a rotor depending upon whether said detection voltage provided by said output voltage detecting means is higher or lower than a predetermined value, wherein the system further comprises a rectifying circuit for rectifying a field current supplied from said exciting winding to said field winding, a smoothing condenser for smoothing a rectified output from said rectifying circuit, a pair of voltage dividing resistors for dividing a charged voltage in said smoothing condenser, and a switch means for forcibly lowering a detection voltage appearing at said detection output terminal of said output voltage detecting means in response to a voltage at a connection point between said pair of voltage dividing resistors exceeding said predetermined value, and wherein when said smoothing condenser is in a state charged with an excessive voltage, said switch means is forcibly turned on in response to said detection voltage being forcibly lowered by said switch means to thereby cause a charged current in said smoothing condenser to be discharged.

2. An automatic voltage-regulating system according to claim 1, wherein said switch means is a transistor which forcibly short-circuits the detection voltage appearing at said detection output terminal by conducting.

* * * * *